United States Patent
Polido et al.

(10) Patent No.: US 12,194,627 B1
(45) Date of Patent: Jan. 14, 2025

(54) MODULAR ROBOTIC MANIPULATION SYSTEMS

(71) Applicant: Amazon Technologies, Inc., Seattle, WA (US)

(72) Inventors: Felipe De Arruda Camargo Polido, North Reading, MA (US); William Clay Flannigan, Lynnfield, MA (US); Timothy G. Dietz, Reading, MA (US); William Eugene Clem, Seattle, WA (US); Vincent Kerstholt, Medford, MA (US); Bart Heerikhuisen, Harderwijk (NL); Ernst Bahlman, Harderwijk (NL); Ruben Boerhof, Harderwijk (NL)

(73) Assignee: Amazon Technologies, Inc., Seattle, WA (US)

( * ) Notice: Subject to any disclaimer, the term of this patent is extended or adjusted under 35 U.S.C. 154(b) by 757 days.

(21) Appl. No.: 17/362,897

(22) Filed: Jun. 29, 2021

(51) Int. Cl.
*B25J 9/08* (2006.01)
*B25J 13/06* (2006.01)
*B25J 21/00* (2006.01)
*B65G 47/91* (2006.01)
*B66F 9/06* (2006.01)

(52) U.S. Cl.
CPC ............... *B25J 9/08* (2013.01); *B25J 13/06* (2013.01); *B25J 21/00* (2013.01); *B65G 47/917* (2013.01); *B66F 9/063* (2013.01)

(58) Field of Classification Search
CPC ..... B25J 9/08; B25J 13/06; B25J 21/00; B25J 9/00; B65G 47/917; B66F 9/063
See application file for complete search history.

(56) References Cited

U.S. PATENT DOCUMENTS

| | | | |
|---|---|---|---|
| 11,040,453 B2 * | 6/2021 | Hino | B25J 9/0087 |
| 11,623,339 B1 * | 4/2023 | Dietz | B25J 9/0084 |
| | | | 700/245 |
| 11,794,335 B2 * | 10/2023 | Hahn | B25J 5/007 |
| 11,932,501 B2 * | 3/2024 | Hau | B65G 61/00 |
| 11,958,188 B2 * | 4/2024 | Lii | B25J 9/0084 |
| 11,970,343 B1 * | 4/2024 | Terhuja | B25J 9/1679 |
| 2021/0323769 A1 * | 10/2021 | Lert, Jr. | B65G 1/1375 |
| 2022/0080578 A1 * | 3/2022 | Loinger | B25J 19/0075 |
| 2023/0331498 A1 * | 10/2023 | Hau | B25J 9/0093 |

* cited by examiner

*Primary Examiner* — Patrick H Mackey
(74) *Attorney, Agent, or Firm* — Eversheds Sutherland (US) LLP

(57) ABSTRACT

Systems, methods, and computer-readable media are disclosed for modular robotic manipulation systems. In one embodiment, an example modular robot assembly may include a housing having a base, and a robotic manipulator coupled to the base, where the housing is configured to provide the robotic manipulator access to a first side, a second side, and a third side of the modular robot assembly. The module robot assembly may include a first camera system, a controller, and an optional display coupled to the housing. The modular robot assembly may be configured to be coupled to other modular robot assemblies, and the housing may be configured to be secured, such that the modular robot assembly can be independently transported.

20 Claims, 12 Drawing Sheets

MODULAR ROBOTIC MANIPULATION SYSTEMS

BACKGROUND

Warehouses, fulfillment centers, and other such locations may be used for item storage, packaging of items, shipping or distribution of items, and other tasks. Inside such locations, machines may be used in combination with human effort to perform certain tasks. For example, forklifts may be used to move pallets of materials from one location to another. For some tasks, robotic manipulators, such as robotic arms, may be used. Robotic arms may be needed in various locations. However, certain robotic manipulators may be in fixed locations or otherwise difficult to move. For example, due to power constraints, robotic manipulators may not be moveable and may therefore be designated to perform a specific task. In addition, depending on an item processing load at a fulfillment center or other facility, temporary increases in processing capabilities, such as an increased number of robotic manipulators, may be needed. Mobile robots and/or robotic arms may therefore be desired.

Figure 1:
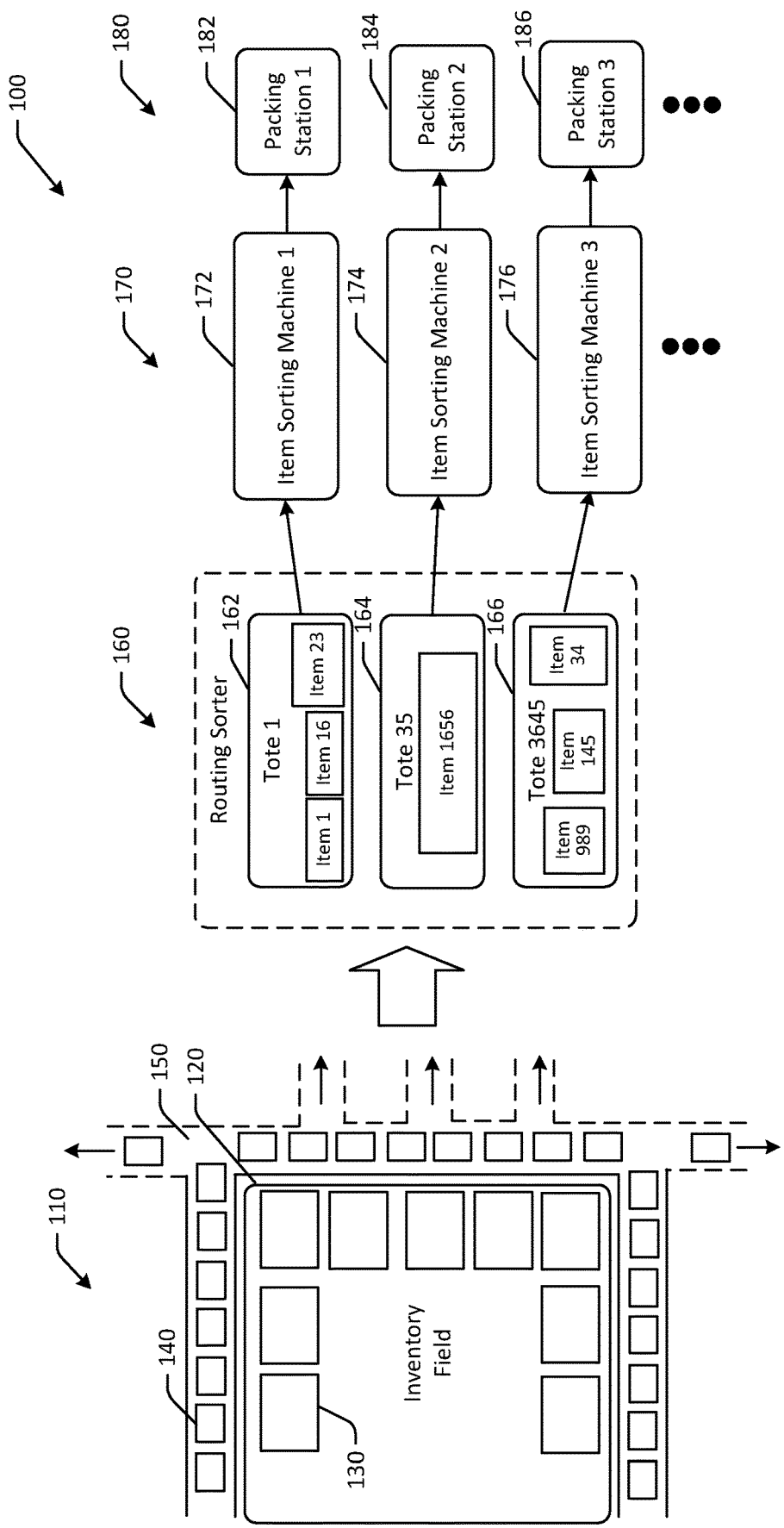
FIG. 1 is a hybrid schematic illustration of an example use case for modular robotic manipulation systems and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers and other facilities, such as sortation centers and so forth, may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products throughout a fulfillment or distribution center (or other facility) may be time consuming and labor intensive.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, may be difficult depending on a type of packaging in which the item comes with. Further, once all of the items in an order are aggregated (for either single item or multi-item orders), the items may be placed into boxes for shipping. The boxes may then be loaded onto trucks or other forms of transport.

Accordingly, at various stages and/or locations within a fulfillment center, different tasks may need to be performed, some of which require different skills. Humans may be able to perform each of the different tasks, whereas robots may need specific equipment or may not be able to move within a fulfillment center so as to reach the different locations at which the different tasks are to be performed. In some instances, robots may be able to assist humans in performing certain tasks, or may automate certain tasks, thereby increasing human effort efficiency and/or allowing human effort to be focused on higher cognition tasks. However, in order to assist humans and/or autonomously perform tasks, robots need to be in the correct location. Some robots may have limited movement ability and/or may be permanently fixed at a location due to power requirements (e.g., specific power needs or connection types, etc.), due to size or footprint (e.g., the robot is too large or heavy to move, etc.), due to stability (e.g., the robot is bolted to the floor for stability, etc.), and so forth. As a result, modular robotic manipulation systems may be desired. Such modular robotic manipulation systems may include robotic systems with different functional capabilities, and may be rapidly deployable to different locations within a facility for quick startup.

Embodiments of the disclosure include methods and systems for automated performance of different programmable or selectable tasks at different locations of a fulfilment center or other facility using modular robotic manipulation systems. Certain embodiments include robotic systems on pallets or otherwise portable platforms that provide semi-static solutions for temporary or prolonged use. Different modules of modular robotic manipulation systems may have different equipment and may be configured to perform different tasks. Multiple modules can be coupled to perform a sequence of actions. In one example embodiment, a modular robotic manipulation system may include a robotic manipulator, such as a robotic arm, a controller or on-board computer system, a rack with computing and network equipment, a display or a human user interface, low-voltage and power electronics cabinets, an expandable cantilevered camera mounting system, a high-flow vacuum generator for vacuum-based end of arm tools (e.g., suction cups for robotic arms, etc.), and a robot mounted camera arm. Some embodiments may not include a display, and may instead include hardware for wired or wireless communication using an externally connected device with a display. Other embodiments may include a display coupled to the housing, where the display is in electrical communication with a controller, and where the controller and display together form a human-machine interface configured to locally control operation of the modular robot assembly. Some embodiments may be configured such that the robotic manipulator can access at least three sides of the module, to provide additional flexibility for functions that are performed by the module. Certain embodiments further can be positioned in association with fiducials or other identifiers within a facility, thereby providing additional advantages with respect to manufacturing and deployment of modular robotic manipulation systems. For example, embodiments of the disclosure can be produced, tested, and calibrated before being deployed or transported to facilities, resulting in reduced deployment time and increased consistency across robotic performance.

Certain embodiments include assemblies with one or more robotic arms that include picking assemblies to pick up and/or release, or otherwise handle, objects, so as to increase throughput and speed of object handling. Some embodiments include cameras that can be used to guide robotic arms to perform certain tasks. Certain embodiments include robotic assemblies that can easily be transported from one location to another, for example using a forklift, and do not require concrete reinforcement. In some instances, more than one module can be included in the same modular robotic manipulation system. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Some embodiments may be configured to rapidly deploy one or more robotic manipulators to perform multiple types of automation tasks in a warehouse fulfilment environment, such as item picking, item sortation, packaging, item consolidation and so forth (where items, as used herein, may include packages of one or more items, etc.). Unlike other robotic arm deployments, embodiments of the disclosure may not be semi-permanent installations (e.g., may not be bolted to the floor, etc.) with dedicated fencing. Instead, embodiments of the disclosure are mobile and can be moved anywhere within a warehouse to perform tasks. This may be particular useful when positioned in a middle of a facility space, as opposed to about a perimeter of the space, where perimeter space may be at a premium and may have a number of fixed components already in position. When parked or secured, embodiments of the disclosure may optionally be stabilized by leveling feet and the assemblies own inertia, and may not have to be permanently attached to the floor or other structure. Associate functional safety is ensured by using a collaborative robotic platform and is further enabled by sensors that establish a safe operating zone.

Referring to FIG. 1, an example use case 100 for modular robotic manipulation systems and an example process flow in accordance with one or more embodiments of the disclosure. Although discussed in the context of online orders and fulfillment centers, other embodiments may be directed to any suitable use case where objects are picked and released, such as instances where objects are picked from inventory, placed into containers, removed from containers for sorting, and so forth in any suitable environment.

In FIG. 1, a fulfillment center may include an inventory field 110, a routing sorter 160, one or more item sorting machines 170, and one or more packing stations 180. The inventory field 110 may be include a storage platform, or a portion of the fulfillment center at which products picked from product inventory are placed. Robots, such as a modular robotic manipulation system, may be used to pick products from inventory and to deliver to the robotic storage platform in some instances, while in other instances, manual labor or a combination thereof may be used to pick products. For example, modular robotic manipulation systems may be used to pick objects from inventory containers and to place the retrieved objects into containers. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote ("tote" as used herein can be any suitable container).

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include modular robotic manipulation systems, or a combination thereof. In some instances, picking of items from the inventory field 110 may be completed by robots that include modular robotic manipulation systems, where the items are delivered to the picking stations 130 after being retrieved from the inventory field 110. Any number of picking stations 130 may be included, and the picking stations 130 may be located in a different position than that illustrated in FIG. 1.

One or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more totes 140. For example, as totes 140 move along the conveyors 150, items may be moved from the picking stations 130 into respective totes 140. The totes 140 may be optionally associated with particular item sorting machines, and may be moved using the conveyors 150 to a routing sorter 160.

In some embodiments, contents of totes may be consolidated in a tote consolidation process. For example, items from different totes destined for the same destination in a facility may be aggregated into a single tote. To consolidate the items, items from one or more totes may be removed and placed into another tote. Certain modular robotic manipulation systems may be configured to perform the tote consolidation process, or to otherwise consolidate items, using a robotic manipulation module and one or more other modules. For example, the robotic manipulation module may be part of a core module of the modular robotic manipulation system, and may be configured to retrieve items from one tote and deliver the items to another tote. Depending on where current needs for tote consolidation are within a facility, modular robotic manipulation systems may be deployed accordingly, and may be configured to consolidate totes continuously. In some instances, tote consolidation may involve moving items from a single source tote to one of multiple totes that are each headed for different destinations, such as different downstream process destinations.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Items may be inducted to item sorting machines from totes by one or more modular robotic manipulation systems. For example, modular robotic manipulation systems may retrieve individual items from totes and place the items on conveyors or other devices such that the items are input to the item sorting machine for sortation.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time. Packing of items may include placement of items into boxes by, for example, modular robotic manipulation systems. The modular robotic manipulation systems may retrieve sorted items from the item sorting machines and place the item into a box.

At any of the stages of the example fulfillment process of FIG. 1 where handling of objects is used, such as to pick items from inventory, place items in totes, remove items from totes, place items into bins, remove items from bins, place items into boxes for shipping, and so forth, modular robotic manipulation systems as described herein may be used. As a result, manual effort can be redirected to other tasks. Moreover, in some instances, modular robotic manipulation systems may be moved from one task and/or section of the fulfillment center to another to perform different tasks as needed to assist with volume, workload, bottlenecks, and the like.

As a result of modular robotic manipulation systems, customers may benefit from speedier package delivery even during peak order periods. Modular robotic manipulation systems may be rapidly deployed (e.g., in under 10 minutes) in compact locations, and can safely operate next to humans without fencing. Embodiments include a safety certified robot arm, and may include one or more of an end-of-arm tool (e.g., picker, etc.), a suite of sensors, and/or a collection of smart fulfillment applications. Modular robotic manipulation systems may perform different tasks, which may be determined based at least in part on location, user input, automated scanning (e.g., of a machine readable code such as a QR code, barcode, fiducial, etc.), or another input. For example, modular robotic manipulation systems may pick a customer order from a tote and place it in the shipping box for taping by a human. Some embodiments may operate unattended. Embodiments may be configured to induct over 1 million items or more per day in a fulfillment center. Some modular robotic manipulation systems include intuitive interfaces, and can perform collaborative assistive tasks that enhance human throughput while reducing ergonomic stressors. Modular robotic manipulation systems automate ergonomically stressful tasks, while allowing humans to perform high-cognition tasks. Modular robotic manipulation systems may be fully commissioned, calibrated, and tested off-site, so as to bring onsite setup time down dramatically.

Example embodiments of the disclosure provide a number of technical features or technical effects. For example, in accordance with example embodiments of the disclosure, certain embodiments of the disclosure may improve processing speed, throughput, and/or efficiency of fulfillment centers. Certain embodiments may improve performance of mechanical equipment for sortation and/or consolidation of items. While described in the context of online orders, aspects of this disclosure are more broadly applicable to other forms of object handling. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
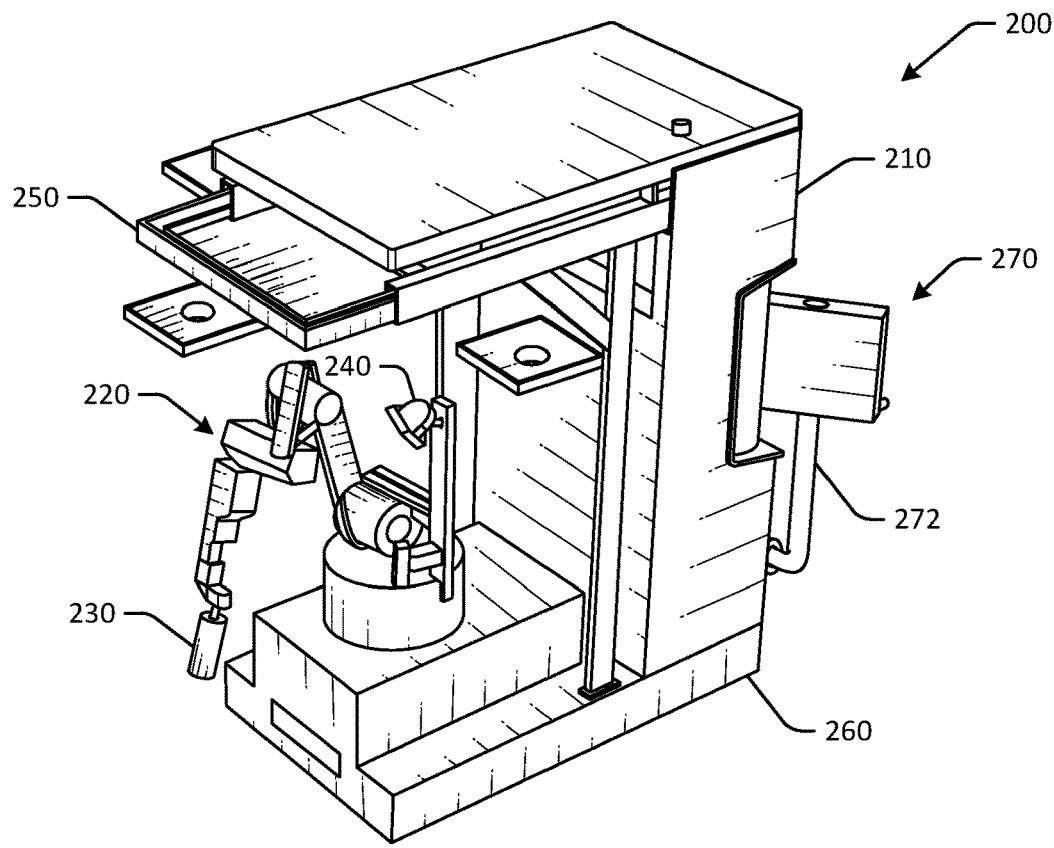
FIG. 2 is a schematic illustration of an example modular robotic manipulation system in various views in accordance with one or more embodiments of the disclosure.
Figure 2:
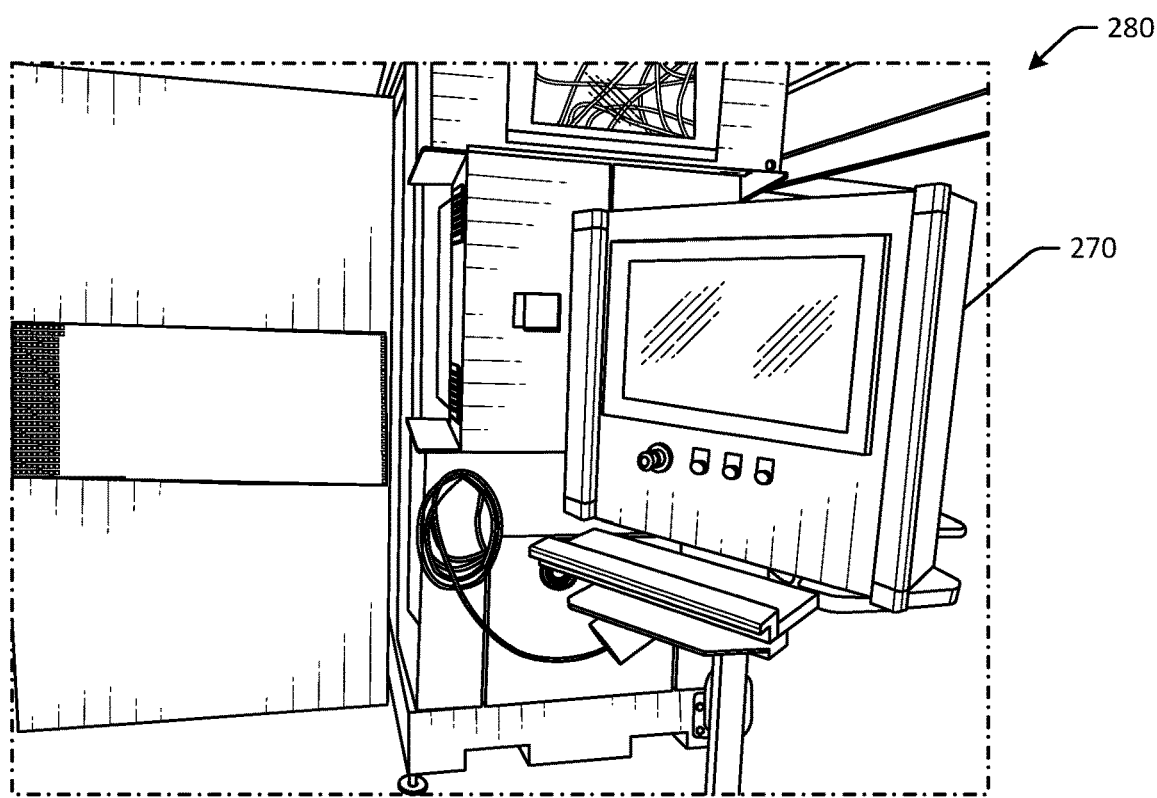

FIG. 2 is a schematic illustration of an example modular robotic manipulation system in various views in accordance with one or more embodiments of the disclosure. Other embodiments may include additional or fewer components. The illustration of FIG. 2 may not be to scale, and may not be illustrated to scale with respect to other figures. The modular robotic manipulation system illustrated in FIG. 2 may be the modular robotic manipulation system discussed with respect to FIG. 1.

In FIG. 2, a modular robotic manipulation system 200 is depicted in perspective view. The modular robotic manipulation system 200 may be one module and may operate as a standalone module, or may be coupled to other modules to perform different tasks. For example, in a standalone configuration, such as that depicted in FIG. 2, the modular robotic manipulation system 200 may be configured to grasp items using an end of arm tool coupled to a robotic arm, and to move the items from one location to another. In some embodiments, the modular robotic manipulation system 200 may be a core module around which other modules may be positioned to perform a variety of tasks.

The modular robotic manipulation system 200 may be a portable robot assembly, in that the modular robotic manipulation system 200 may be fully enclosed in its housing 210, and transported from one location to another. The modular robotic manipulation system 200 may not have to be permanently coupled to a floor or other structure of a facility. The housing 210 may be a removable housing that is configured to secure the modular robotic manipulation system 200 during transport. The housing 210 is discussed in more detail with respect to FIG. 4. In some embodiments, the housing 210 may form, or the modular robotic manipulation system 200 may otherwise include, a computer rack or a computer closet. A controller or other computer system coupled to the computer rack. The modular robotic manipulation system 200 may be configured to operate using 120 volt power, 220 volt power, or another standard wall outlet grid power.

The modular robotic manipulation system 200 may include a base 260. The components of the modular robotic manipulation system 200 may be disposed on the base 260. The housing 210 may be coupled to the base 260. During transport, the modular robotic manipulation system 200 may be manipulated via the base 260. For example, the modular robotic manipulation system 200 may be lifted via lifting of the base 260.

The modular robotic manipulation system 200 may include a robotic manipulator 220, such as a robotic arm, that may be coupled to an optional end of arm tool 230. The robotic manipulator 220 may be configured to move the end of arm tool 230 in three-dimensional space from one location to another. For example, the modular robotic manipulation system 200 may use the robotic manipulator 220 to position the end of arm tool 230 adjacent to an item, and may use the end of arm tool 230 to grasp the item and move the item from one location to another location. The modular robotic manipulation system 200 may include an on-board vacuum generator that is used to provide positive and/or negative air pressure to the end of arm tool 230. The end of arm tool 230 may be coupled to the robotic manipulator 220 and the vacuum generator.

The robotic manipulator 220 may be coupled to the base 260, and may be configured to access a first external side, a second external side, and a third external side of the modular robotic manipulation system 200. The modular robotic manipulation system 200 may therefore be configured to identify and grasp individual items using the robotic manipulator 220, and to release the individual items, such as into a container of a plurality of containers. In other instances, items may be grasped from a plurality of containers and placed into a single destination container. The robotic manipulator may be configured to identify and grasp consecutive individual items having different geometries (e.g., a basketball and then a rectangular box and then a plastic bag, etc.), and to place the respective individual items at a particular location in a container selected from multiple containers.

The robotic manipulator 220 may include any number of different interchangeable tool attachments, such as a picking assembly configured to grasp objects, a camera, other sensors, other suction and/or mechanical tools, or another tool attachment. The robotic manipulator 220 may include, or may be coupled to, a torque resistance sensor to improve safety and/or performance of the robotic manipulator 220.

The modular robotic manipulation system 200 may include a sensor suite arm 240 that may include one or more sensors, such as cameras, scanners, and so forth that may be used to guide movement of the robotic manipulator 220, identify items, and other functions. The sensor suite arm 240 may be static or may be configured to move (e.g., the sensor suite arm 240 may be a robotic arm or a fixed arm, etc.). In some embodiments, the sensor suite arm 240 may be a robotic arm with a cantilevered camera system, a barcode scanner, and/or a camera system coupled to the robotic arm. Other components may be included. Other embodiments may utilize a camera, such as a first camera system disposed about the modular robotic manipulation system, to optically read or detect barcodes or other identifiers, instead of using dedicated barcode scanners or other hardware. Such embodiments may have reduced hardware and complexity. The cantilevered camera system may be a camera system that is repositionable in various locations and can be fixed in a number of positions that are not preset or predefined (e.g., free range of motion, etc.). The sensor suite arm 240 may include a camera assembly configured to image objects grasped by the robotic manipulator 220. For example, the sensor suite arm 240 may include a set of stereo cameras and a scanning camera. The first camera system may be coupled to an arm, such as the sensor suite arm 240. The first camera system may be a cantilevered camera system The modular robotic manipulation system 200 may include an overhead sensor assembly 250 that may include one or more sensors, such as cameras, scanners, and so forth, lights, and/or other hardware that may be used to guide movement of the robotic manipulator 220, identify items, and other functions. The overhead sensor assembly 250 may be statically positioned, or may be slideable relative to a roof surface of the modular robotic manipulation system 200.

The modular robotic manipulation system 200 may include a moveable display 270 coupled to the housing 210 or the computer closet. As depicted in rear view 280, the display 270 may provide a human user interface and may be used to input instructions to control operation of the modular robotic manipulation system 200. Information related to the modular robotic manipulation system 200 may be presented at the display 270. The display 270 may be configured to rotate about one or more members 272 coupled to the housing 210 of the modular robotic manipulation system 200.

Figure 3A:
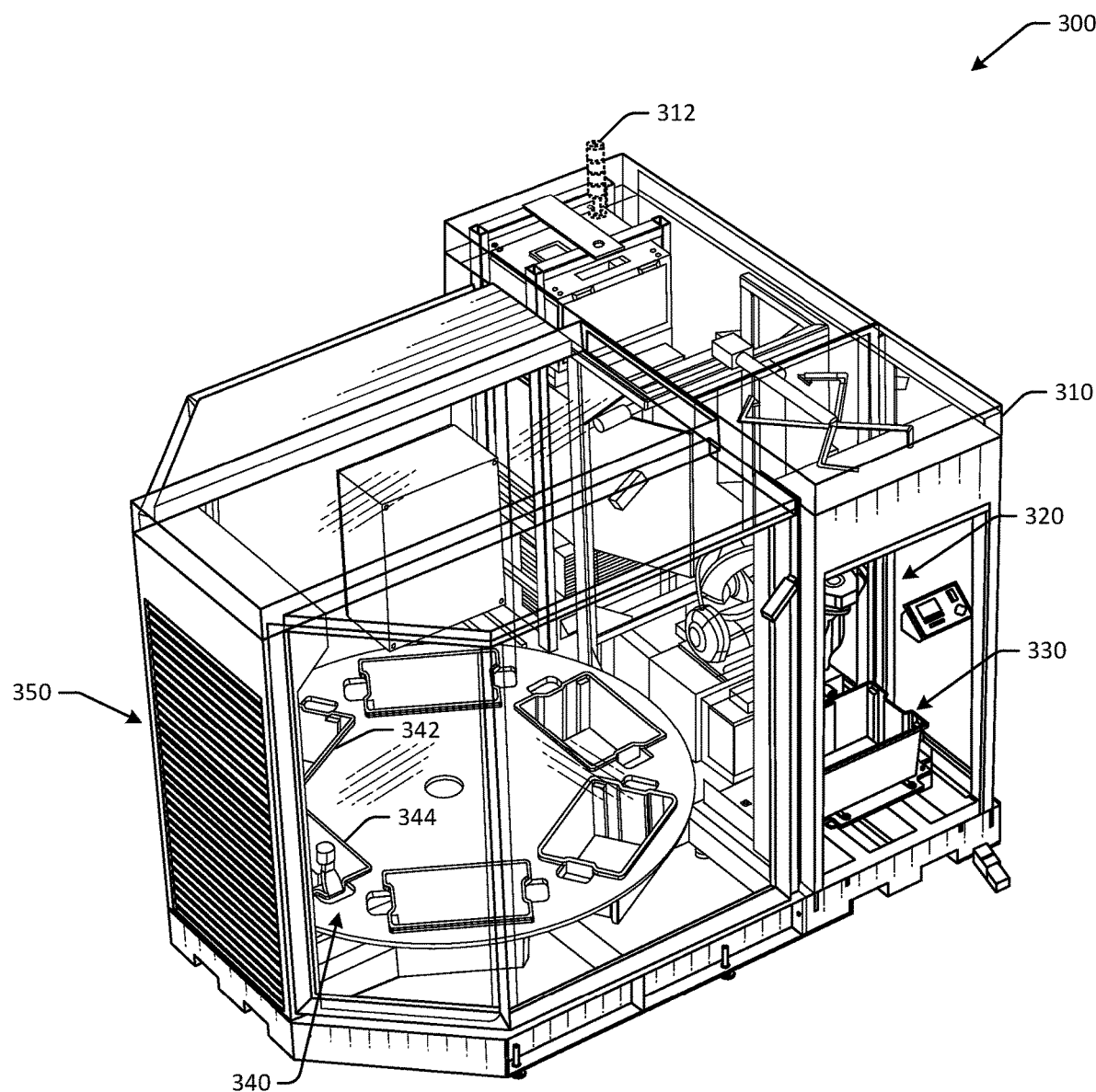
FIGS. 3A-3C are schematic illustrations of an example modular robotic manipulation system in various views in accordance with one or more embodiments of the disclosure.
Figure 3B:
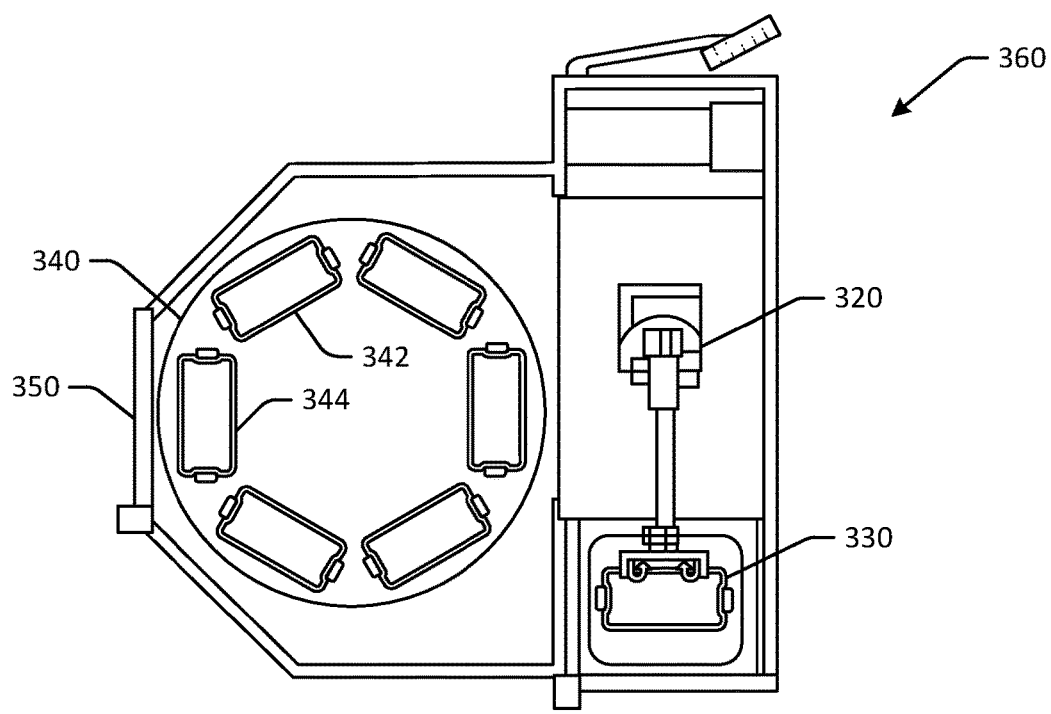
Figure 3B:
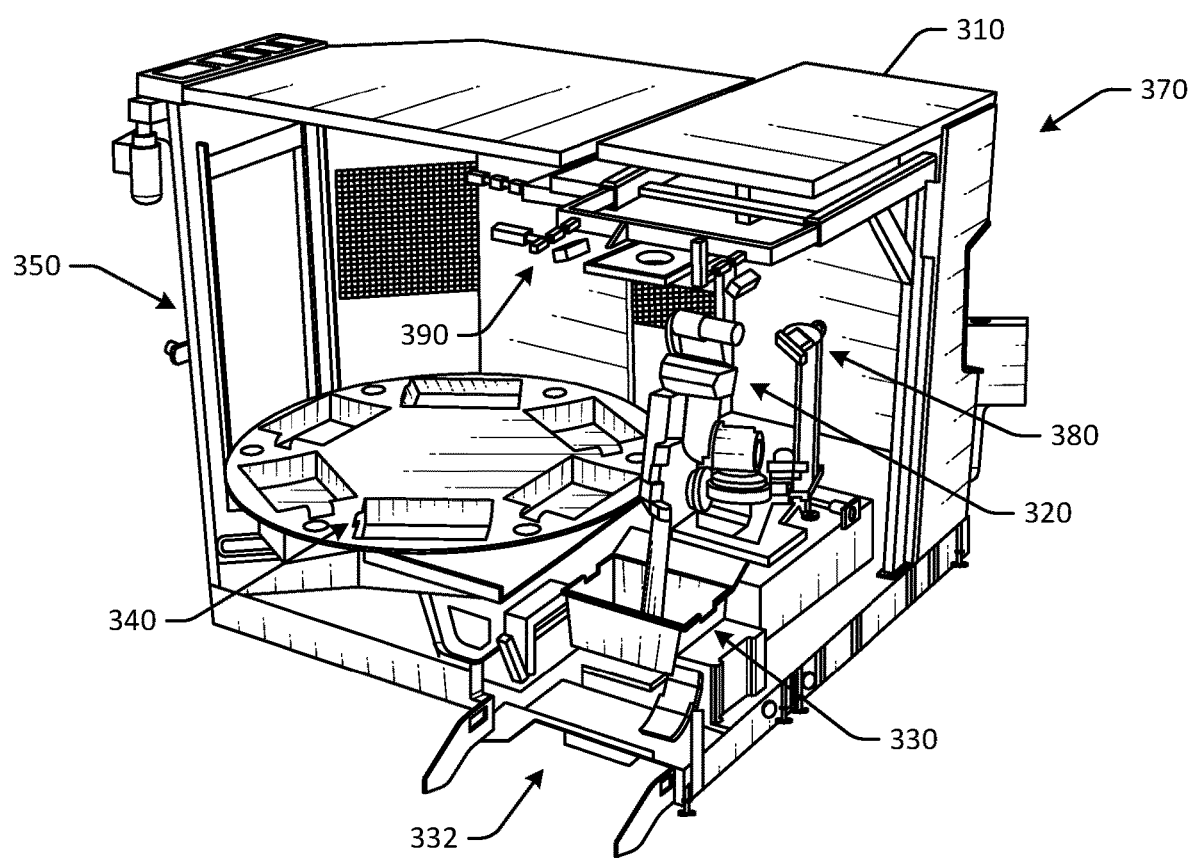
Figure 3C:
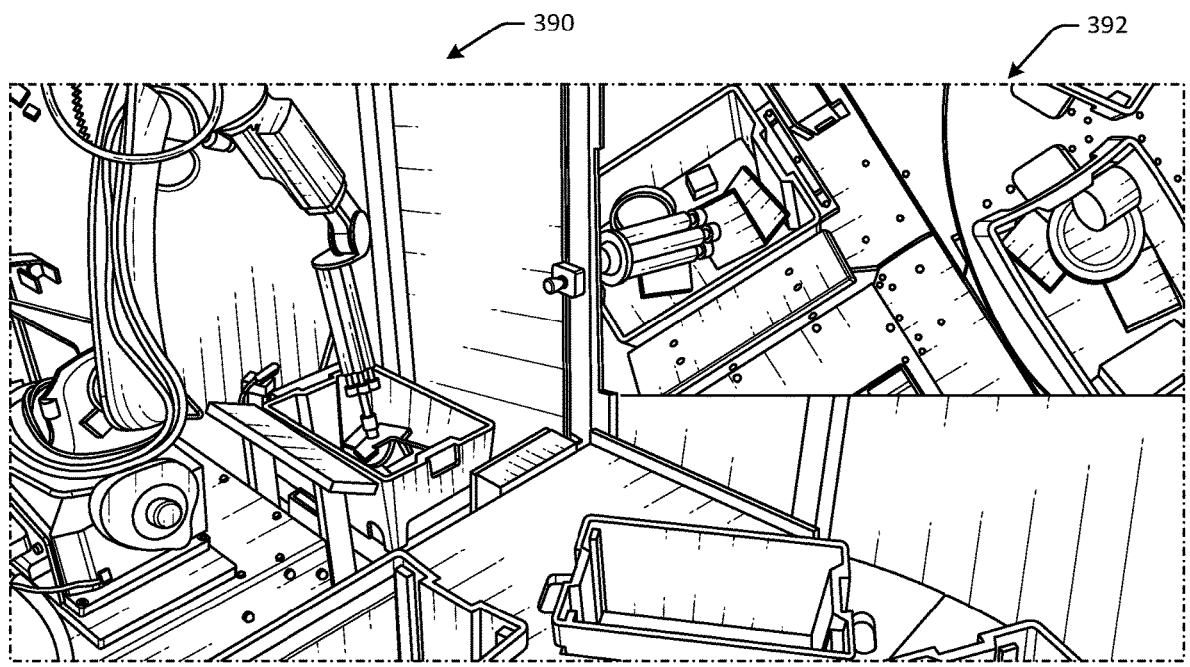

FIGS. 3A-3C are schematic illustrations of an example modular robotic manipulation system in various views in accordance with one or more embodiments of the disclosure. Other embodiments may include additional or fewer components. The illustrations of FIGS. 3A-3C are not to scale, and may not be illustrated to scale with respect to other figures. The modular robotic manipulation system illustrated in FIGS. 3A-3C may include the same modular robotic manipulation system discussed with respect to FIGS. 1-2.

In FIG. 3A, a modular robotic manipulation system 300 is depicted in perspective view, and may include a core module, such as that discussed with respect to FIG. 2, a source tote module, and a tote consolidation module. The core module may be a module with a robotic manipulator 320, such as a robotic arm, and the source tote module may be a module at which a source tote 330 can be input at the modular robotic manipulation system 300. The tote consolidation module may be a turntable-style device with a number of totes into which items from the source tote can be deposited. The modular robotic manipulation system 300 may therefore include a modular robot assembly, such as the core module, that is coupled to a source container modular assembly and a rotating container modular assembly, where the modular robot assembly is configured to grasp items from a container at the source container modular assembly, and to release items into containers of the rotating container modular assembly.

The modular robotic manipulation system 300 may be configured to transport items from the source tote into a tote of the tote consolidation module. Some or all of the totes in the tote consolidation module may be destined for different destinations. The modular robotic manipulation system 300 may therefore be configured to sort items from a singular source tote to multiple different destinations. The tote consolidation module may include hardware configured to move totes from a position adjacent to the robotic manipulator to another position away from the robotic manipulator. For example, in the embodiment depicted in FIG. 3A, the tote consolidation module may include a turntable 340 that can automatically be rotated to position different totes adjacent to the robotic manipulator. The turntable 340 may be a rotating container modular assembly that includes a number of containers, and may be configured to rotate the containers to a position adjacent to the robotic manipulator 320. The modular robotic manipulation system 300 may therefore include, or otherwise be coupled to, a rotating container modular assembly, such as the turntable 340. Other embodiments may include linear sliding totes, tote elevators, or different tote movement mechanisms.

The modular robotic manipulation system 300 may include a housing 310 that can enclose some or all of the modular robotic manipulation system 300, so as to provide a barrier to prevent unintentional contact and to provide a safe operating environment. The housing 310 may also be closed or otherwise secured during transport of the modular robotic manipulation system 300 (e.g., allowing the system to be independently transported without additional pallets, etc.). The modular robotic manipulation system 300 may include an optional visual indicator 312, such as red, yellow, and green lighting, to indicate whether the modular robotic manipulation system 300 is operational at a given point in time.

The modular robotic manipulation system 300 may include the robotic manipulator 320, as depicted in top view 360 of the modular robotic manipulation system 300 and partial cross-section view 370 in FIG. 3B. The robotic manipulator 320 may include a force-torque cell attached at an end of the robotic manipulator 320, adjacent to the end of arm tool (e.g., picking tool, suction tool, imaging tool, etc.). Force can be used to understand how heavy an item is when it is grasped. Knowing the mass can be used to determine how quickly to accelerate the arm to translate the object. Heavy objects accelerated too quickly can be lost to the grasp. Items that are off center can also be lost to the grasp, but the force-torque cell can be used to estimate the amount of cantilever and adjust the angle to minimize the applied torque and the likelihood of losing grasp of the object.

The modular robotic manipulation system 300 may include the source tote module, where the source tote 330 may be input by an operator or an autonomous robot, for transfer of the items inside the source tote 330 to one of the totes in the tote turntable 340. For example, the robotic manipulator 320 may grasp items from the source tote 330, and deposit the items into a first tote 342, a second tote 344, and so forth of the turntable 340. The tote consolidation module 340 may be configured to rotate such that the appropriate destination tote is adjacent to the robotic manipulator 320, so as to facilitate depositing of the item into the correct tote. When totes on the turntable 340 are full or otherwise need to be replaced, a gate 350 may be opened and may provide access to an operator or autonomous robot to retrieve the tote and/or to replace the full tote with an empty tote, while the robotic manipulator 320 continues consolidating items from the source tote 330 to the totes on the turntable. In other embodiments, the reverse process may be performed, where items are removed from the totes on the turntable and placed into the "source" tote 330.

As depicted in the partial cross-section view 370 of FIG. 3B, the source tote module may include a weight scale 332 that may be used to weigh source totes, so as to determine an initial weight of the source tote 330 and/or a continuous weight of the source tote 330 as items are removed from the source tote 330. In some embodiments, the weight scale 332 may be coupled to the base of the modular robotic manipulation system 300. In other embodiments, the weight scale 332 may be positioned external to the source tote module, but may be in communication with the controller. For example, the weight scale 332 may be used to weight a mobile robot, a source tote, or other item. In some instances, the weight scale 332 may be integrated with a mobile robot.

The core module may include an optional sensor suite arm 380. The sensor suite arm 380 may be a fixed member, or may be a moveable robotic arm. The sensor suite arm 380 may include one or more sensors, such as cameras, scanners, and other sensors. In some embodiments, the sensor suite arm 380 may include a first camera system that is coupled to a fixed member or a robotic arm, a second camera system coupled to the fixed member or the robotic arm, one or more barcode scanners coupled to the fixed member or the robotic arm, and/or other sensors. The first camera system and/or the second camera system may be depth cameras, RGB cameras, three-dimensional cameras, or other types of cameras. Any number or type of sensors can be included.

The sensor suite arm 380 may be used to identify items, guide movement of the robotic manipulator, and/or other actions. As depicted in interior view 392 of the modular robotic manipulation system 300 in FIG. 3C, image data 394 from one or more cameras at the sensor suite arm 380 may be used to determine positioning of the robotic manipulator, determine items in a source tote, determine placement position of items in destination totes, and/or other operations.

The modular robotic manipulation system 300 may include an overhead sensor assembly 390 that may be coupled to an upper portion of the modular robotic manipulation system 300. The overhead sensor assembly 390 may include one or more sensors that may be used to determine active totes, determine empty spaces in totes, determine positioning of the robotic manipulator, and/or other functions. The overhead sensor assembly 390 may include a camera, such as a depth camera, a barcode reader or other type of scanner, and/or other sensors. Any number or type of sensors can be included. In some embodiments, the overhead sensor assembly 390 may include an overhead camera system having a first camera configured to image the first external side of the portable robot assembly, and a second camera configured to image the second external side of the portable robot assembly.

In some embodiments, the overhead sensor assembly 390 may include a first camera system that is coupled to a cantilevered camera mounting system. For example, the overhead sensor assembly 390 may include a first camera disposed on a first side of a bracket and disposed at a first angle, and may include a second camera disposed on a second side of the bracket and disposed at a second angle. The first angle may be the opposite of the second angle. The first camera and the second camera may be the same type of camera or different camera types. For example, the first camera and the second camera may both be stereo vision cameras or three-dimensional cameras. Orientations of the first camera and the second camera may be fixed, or may be individually adjustable. The overhead sensor assembly 390 may include a third camera disposed along a middle portion of the bracket. The third camera may be disposed between the first camera and the second camera. The third camera may be the same type of camera as the first camera and/or the second camera, or a different camera type. For example, the third camera may be an area scanning camera, a line scanning camera, a network camera, a three-dimensional camera, or another camera type. The first camera, the second camera, and third camera may be used to for instance segmentation and/or grasp point generation during use of the modular robotic manipulation system 300.

The overhead sensor assembly 390 may include a laser pointer that can be used to manually or automatically aim the respective fields of view of the cameras. For example, when the modular robotic manipulation system 300 is moved from one location or another, the laser pointer may be used to set a position of the overhead cameras. In some embodiments, the laser pointer may be used to direct the overhead cameras to a fiducial or other machine readable code to set a task or operational mode of the modular robotic manipulation system 300. Other embodiments may use any suitable marker of any type instead of, or in addition to, a machine readable code, including magnetic indicators, light-based indicators, or other physical indicators. The machine readable code may be used by the modular robotic manipulation system 300 to determine which tasks to be performed, for calibration, to determine which operational mode to initiate, to determine a location of the modular robotic manipulation system 300, and the like.

The modular robotic manipulation system 300 may include one or more computer systems or controllers configured to control operation of the robotic manipulator 320, cameras, sensors, and other components. For example, a user may select a selectable option via the display that causes the controller to initiate corresponding actions, such as one or more of: item picking, item sorting, item induction, and so forth.

The modular robotic manipulation system 300 may therefore be a robotic system that is configured to identify and grasp individual items using one or more robotic manipulators, and to release the individual items into a container of a plurality of containers that are supported by a rotating container modular assembly, where individual containers of the plurality of containers are designated for different destinations, and the individual items are grasped from a single container, such as the source tote 330. For example, individual items may be grasped from a single container, such as the source tote 330, and may be placed into the individual containers of the plurality of containers on the turntable 340, where the individual containers of the plurality of containers may be designated for different destinations, such as different downstream processes within a facility.

The modular robotic manipulation system 300 may be configured to be transported and deployed in the matter of minutes, as opposed to hours. For example, the modular robotic manipulation system 300 can be used for tote consolidation can be calibrated and shipped to a fulfillment center, where it can then be deployed in the middle of a robotic floor to perform various functions. This not only provides scalable functionality improvements, but also preserves valuable space along the perimeter of the fulfillment center where other equipment may be positioned. The modular robotic manipulation system 300 therefore provides a rapidly deployable and flexible solution to increase fulfillment capacity and throughput at fulfillment centers and other facilities, while providing robust and consistent performance across a number of uses.

Figure 4:
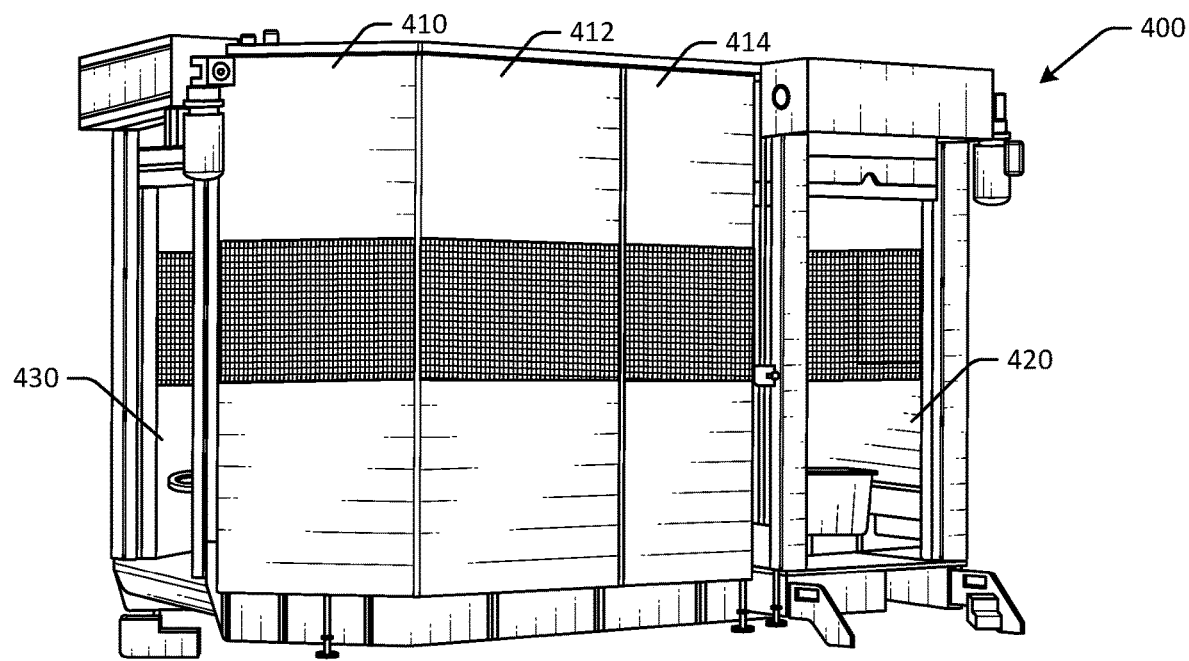
FIG. 4 is a schematic illustration of side views of a modular robotic manipulation system with its housing in a partially closed configuration in accordance with one or more embodiments of the disclosure.
Figure 4:
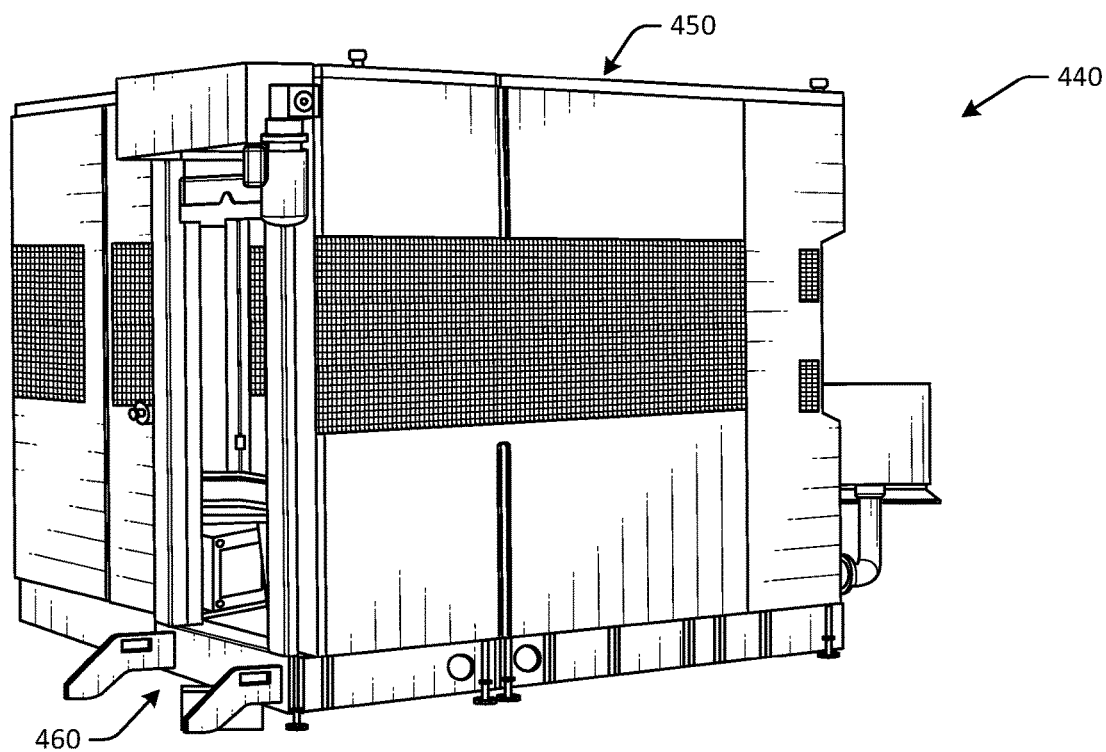

FIG. 4 is a schematic illustration of side views of a modular robotic manipulation system 400 with its housing in a partially closed configuration in accordance with one or more embodiments of the disclosure. Other embodiments may include additional or fewer components. The illustration of FIG. 4 is not to scale, and may not be illustrated to scale with respect to other figures. The modular robotic manipulation system illustrated in FIG. 4 may be the same modular robotic manipulation system discussed with respect to FIGS. 1-3.

In FIG. 4, the modular robotic manipulation system 400 is depicted in front angle view and rear angle view 440 in a partially closed configuration. The modular robotic manipulation system 400 may include one or more modules, such as a core module, a source tote intake module, and a turntable tote destination module. The three modules may be enclosed in a housing of the modular robotic manipulation system 400. For example, a number of panels including a first panel 410, a second panel 412, a third panel 414, rear panels 450 and so forth may enclose the modular robotic manipulation system 400. In the closed configuration, the modular robotic manipulation system 400 may be secured for transport to a location for deployment, for shipment between facilities, and/or other movement. In some embodiments, the modular robotic manipulation system 400 may be deployed while the housing is in the depicted partially closed configuration, where the closed housing panels provide safety and protection against unintentional contact.

The modular robotic manipulation system 400 may include one or more gates that may provide access to an interior of the modular robotic manipulation system 400 when open, and that may secure the modular robotic manipulation system 400 when closed. In FIG. 4, the modular robotic manipulation system 400 may be in a partially closed configuration because a first gate 420 that provides access to the source tote module may be open, such that source totes may be ingested into the modular robotic manipulation system 400. Similarly, a second gate 430 that provides access to totes on the tote turntable may be open, so as to provide access to remove and/or replace totes in the turntable. A ramp 460 may be removably coupled to the modular robotic manipulation system 400, and may allow for autonomous robotic vehicles to offload source totes into the modular robotic manipulation system 400. The modular robotic manipulation system 400 may therefore be robotic systems that are configured to be coupled to a plurality of other modular robot systems, where the robotic system can be independently transported. Some embodiments may include sensors used to detect whether the first gate 420 and/or the second gate 430 are open or not fully secured. If so, operation of the modular robotic manipulation system 400 may be paused.

Figure 5A:
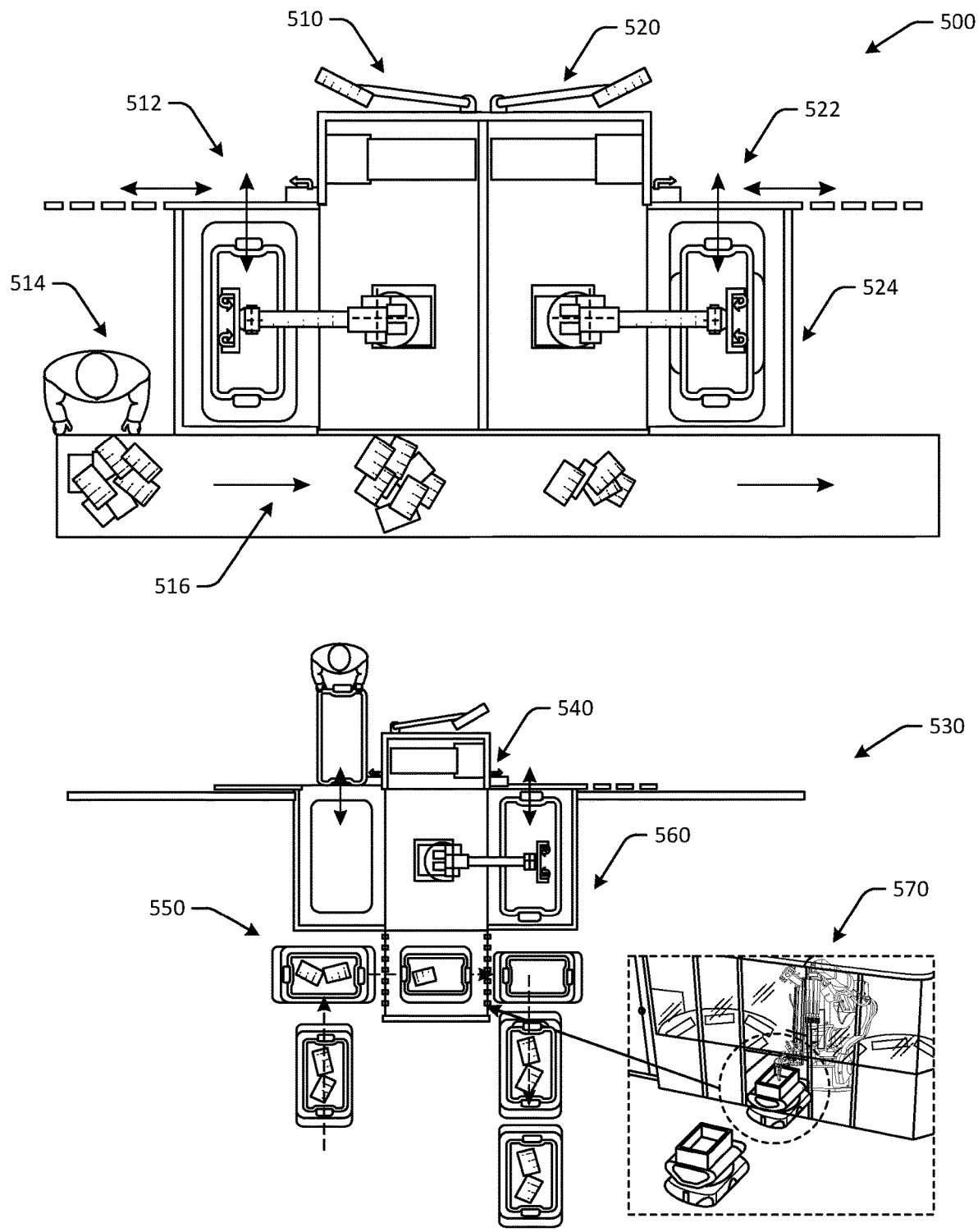
FIGS. 5A-5B are schematic illustrations of a number of modular robotic manipulation systems deployed in various environments in accordance with one or more embodiments of the disclosure.
Figure 5B:
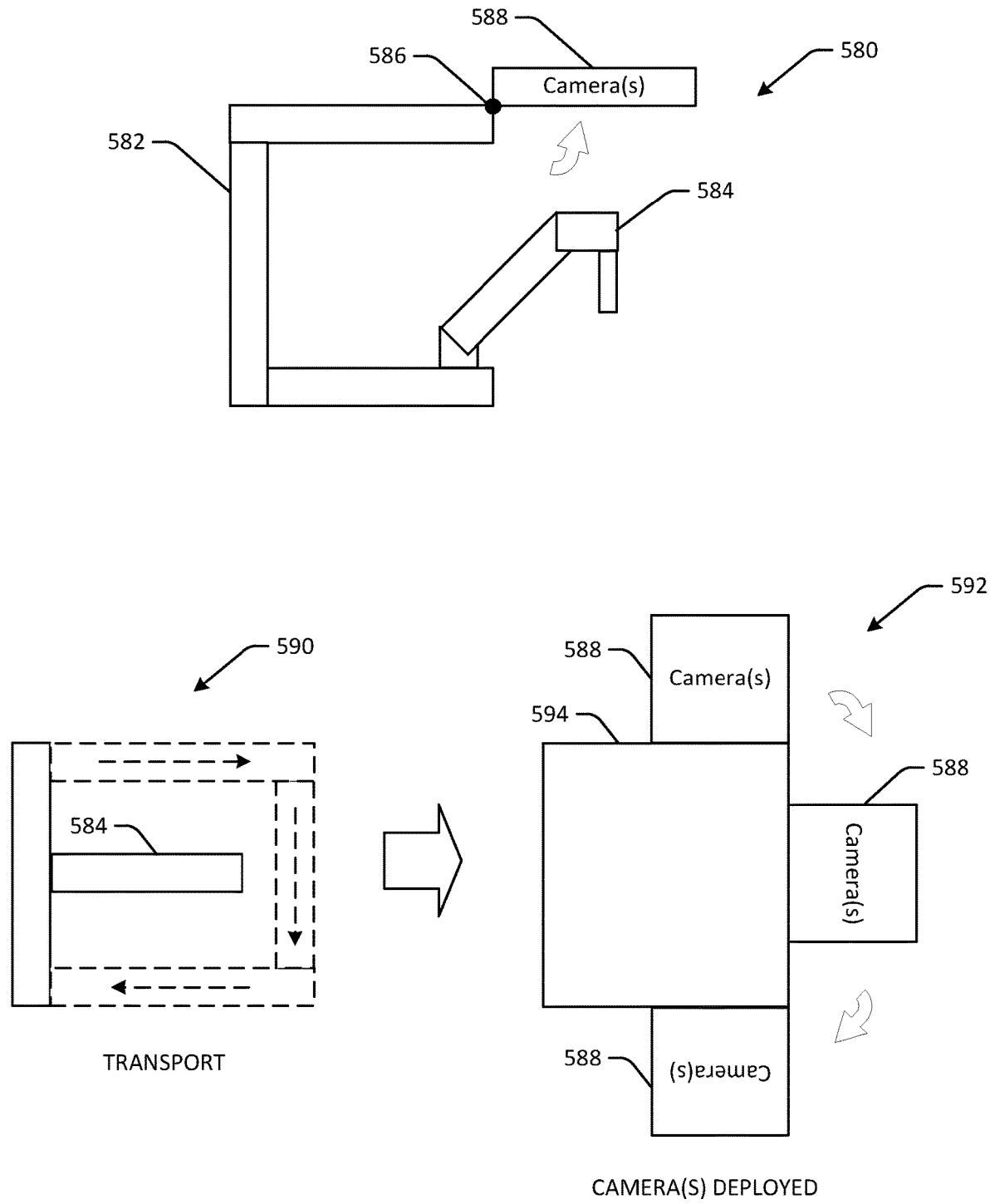

FIGS. 5A-5B are schematic illustrations of a number of modular robotic manipulation systems deployed in various environments in accordance with one or more embodiments of the disclosure. Other embodiments may include additional or fewer components. The illustrations of FIGS. 5A-5B are not to scale, and may not be illustrated to scale with respect to other figures. The modular robotic manipulation systems illustrated in FIGS. 5A-5B may include the same modular robotic manipulation system(s) discussed with respect to FIGS. 1-4.

In a first environment 500 in FIG. 5A, a first modular robotic manipulation system 510 may be used in conjunction with a second modular robotic manipulation system 520 to load or unload carts with items, such as objects, packages, or other items, from a conveyor 516. For example, the first modular robotic manipulation system 510 may be configured to load or unload items from a first cart 512. The first cart 512 may be moved into position adjacent to the first modular robotic manipulation system 510 by an operator 514 or by an autonomous robotic vehicle. The operator 514 may manipulate items on the conveyor 516 in some instances. Similarly, the second modular robotic manipulation system 520 may be configured to load or unload items from a second cart 522. The second cart 522 may be moved into position adjacent to the second modular robotic manipulation system 520 by the operator 514 or by an autonomous robotic vehicle. As the carts are loaded or unloaded, the carts may be removed and replaced with other carts.

In a second environment 530 in FIG. 5A, a modular robotic manipulation system 540 that includes a robotic arm may be configured to load or unload items from carts into totes that are disposed on autonomous robotic vehicles 550. For example, carts 560 may be placed at one or more sides of the modular robotic manipulation system 540. The modular robotic manipulation system 540 may use the robotic arm to load or unload items from the one or more carts 560. The items may be placed into (or removed from) one or more totes that are disposed on individual autonomous robotic vehicles 550. As depicted in close-up view 570, the modular robotic manipulation system 540 may include an enclosed portion where an autonomous robotic vehicle can be positioned adjacent to the robotic arm, such that items can be removed from or placed into the tote on the autonomous robotic vehicle. Because carts can continually be removed and replaced, the modular robotic manipulation system 540 may continue to consolidate items without interruption from either cart. The autonomous robotic vehicles 550 may move in a predetermined or autonomously determined path and/or sequence about the modular robotic manipulation system 540, and the modular robotic manipulation system 540 may determine which of the totes any particular item is to be deposited into and/or retrieved from.

Accordingly, in one embodiment, the modular robotic manipulation system 540 may be configured to retrieve items from a source tote or a source cart, such as one of the carts 560, and to deposit the item into a container that is selected from a plurality of containers. For example, the plurality of containers may include a first container coupled to a first mobile robot, such as one of the autonomous robotic vehicles 550, and a second container coupled to a second mobile robot, such as another one of the autonomous robotic vehicles 550, where the first mobile robot is configured to move the first container from a first location relative to the modular robotic manipulation system to a second location, and the second mobile robot is configured to move the second container from the first location relative to the modular robotic manipulation system to the second location. In other embodiments, the first mobile robot and the second mobile robot may be configured to move the containers to different destinations.

In FIG. 5B, a modular robotic manipulation system is depicted in side view 580. The modular robotic manipulation system may include a C-shaped structure 582 with a robotic manipulator 584 that is configured to work in a robotic workspace, as depicted in top views 590 and 592. A number of cameras 588 may be coupled to the C-shaped structure 582 via one or more hinges 586 that allow the cameras 588 to move about the robotic workspace. In some embodiments, the cameras 588 may include an overhead camera system having a first camera configured to image the first external side of the portable robot assembly, and a second camera configured to image the second external side of the portable robot assembly. In some embodiments, items and/or containers may be transported about the modular robotic manipulation system as depicted in top view 590. The robotic manipulator 584 may be configured to interact with items in any of the containers and/or conveyor systems disposed about the modular robotic manipulation system, which may optionally move about the modular robotic manipulation system in the illustrated directions. An upper housing portion 594 to which the cameras 588 may be coupled may allow for the cameras 588 to be deployed in different configurations about the modular robotic manipulation system, as depicted in top view 592. As the cameras 588 are deployed, the movement of the robotic manipulator 584 may be imaged across the entirety of the robotic workspace. In other embodiments, the cameras 588 may not necessarily be overhead cameras. The cameras 588 may optionally include a first camera configured to image the first side, and a second camera configured to image the second side. One or more of the cameras 588 may be vertically rotatable with respect to the housing, such that the cameras can be stored in a vertical position during transport, and can then be deployed in a horizontal position.

Figure 6:
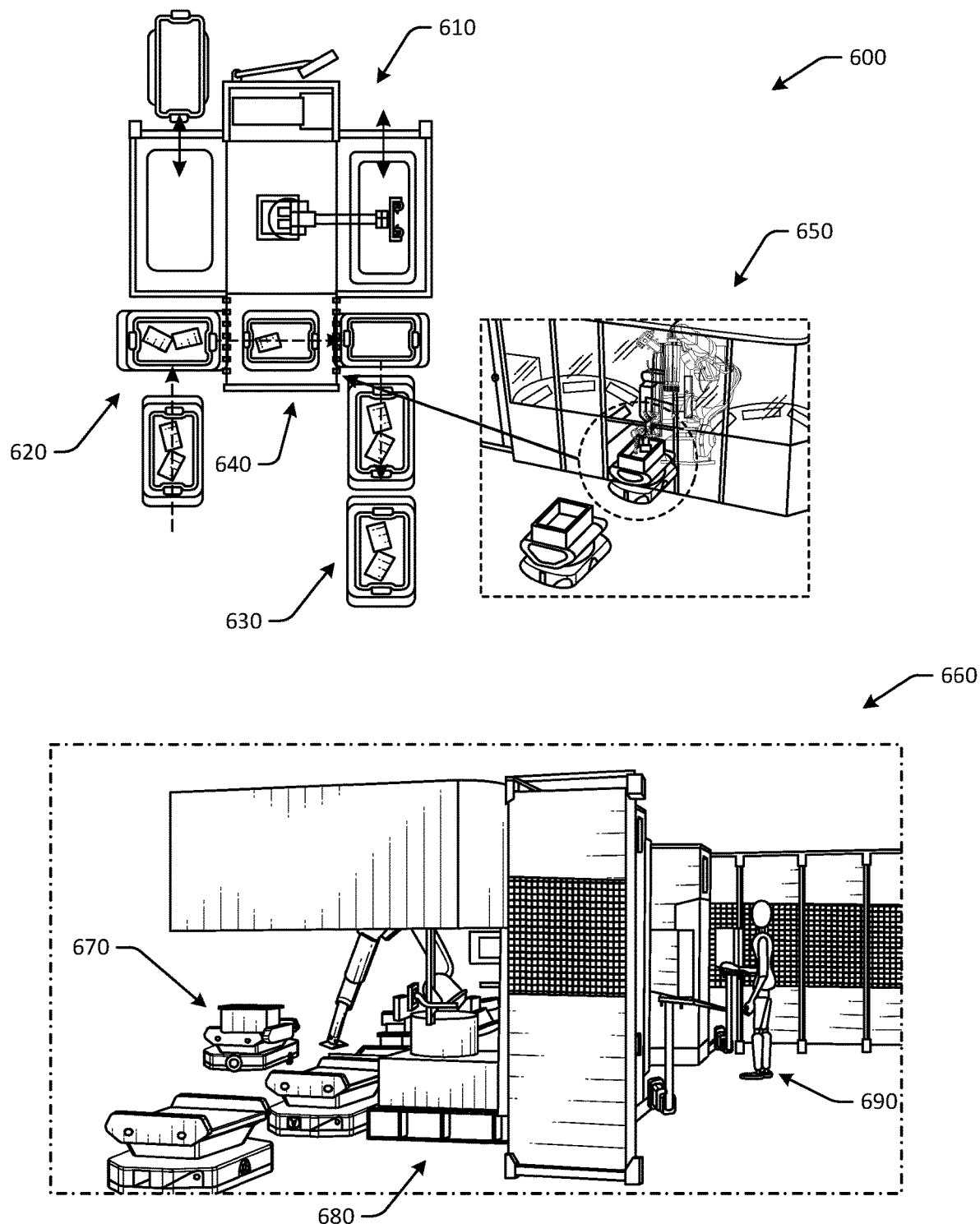
FIG. 6 is a schematic illustration of a number of modular robotic manipulation systems deployed in various environments in accordance with one or more embodiments of the disclosure.

FIG. 6 is a schematic illustration of a number of modular robotic manipulation systems deployed in various environments in accordance with one or more embodiments of the disclosure. Other embodiments may include additional or fewer components. The illustration of FIG. 6 is not to scale, and may not be illustrated to scale with respect to other figures. The modular robotic manipulation systems illustrated in FIG. 6 may include the same modular robotic manipulation system(s) discussed with respect to FIGS. 1-5B.

In a first environment 600, similar to the second environment 530 depicted in FIG. 5A, a modular robotic manipulation system 610 that includes a robotic arm may be configured to load or unload items from carts into totes that are disposed on autonomous robotic vehicles 620. For example, carts may be placed at one or more sides of the modular robotic manipulation system 610. The modular robotic manipulation system 610 may use the robotic arm to load or unload items from the one or more carts 620. The items may be placed into (or removed from) one or more totes that are disposed on individual autonomous robotic vehicles 620. As depicted in close-up view 650, the modular robotic manipulation system 610 may include an enclosed portion 640 where an autonomous robotic vehicle can be positioned adjacent to the robotic arm, such that items can be removed from or placed into the tote on the autonomous robotic vehicle. Because carts can continually be removed and replaced, the modular robotic manipulation system 610 may continue to consolidate items without interruption from either cart. The autonomous robotic vehicles 620 may move in a predetermined or autonomously determined path and/or sequence 630 about the modular robotic manipulation system 610, and the modular robotic manipulation system 610 may determine which of the totes any particular item is to be deposited into and/or retrieved from.

Unlike the second environment 530 depicted in FIG. 5A, in the first environment 600 of FIG. 6, the carts may be moved into position adjacent to the modular robotic manipulation system 610 by an autonomous robotic vehicle. As a result, the modular robotic manipulation system 610 may be deployed on a robot floor or in a space designated for robots, without additional components that may be needed for human interaction. The modular robotic manipulation system 610 may therefore interact with totes and carts that are handed by autonomous robotic vehicles.

In a second environment 660 of FIG. 6, instead of a tote turntable, a modular robotic manipulation system 680 may be configured to sort items into totes disposed on one or more autonomous robotic vehicles 670 from a conveyor or other source. In the second environment 660, totes may not have to be manually loaded or unloaded from a tote turntable, thereby reducing replacement time and manual handling. An operator 690 could control destinations of items and/or autonomous robotic vehicles using a computer system coupled to the modular robotic manipulation system 680.

The modular robotic manipulation system 610 and/or the modular robotic manipulation system 680 may therefore be robotic systems that are configured to identify and grasp individual items using respective robotic manipulators, and to release the individual items into a container of a plurality of containers that are coupled to respective individual autonomous robotic vehicles, where individual containers of the plurality of containers are designated for different destinations, and the individual items are grasped from a single container, such as a source container or a source cart.

Figure 7:
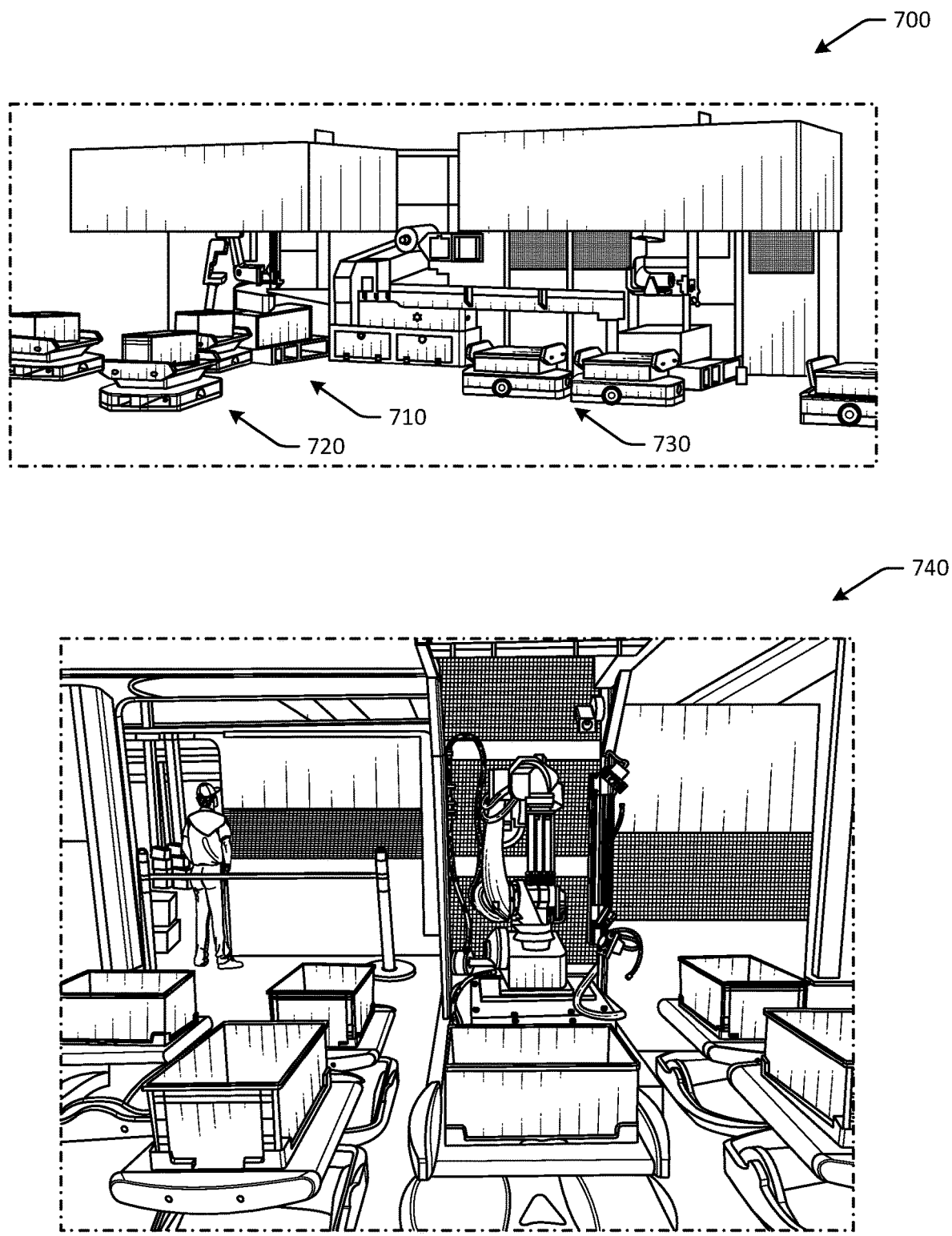
FIGS. 7-8 are schematic illustrations of a modular robotic manipulation system configured to consolidate items into containers coupled to autonomous robotic vehicles in accordance with one or more embodiments of the disclosure.
Figure 8:
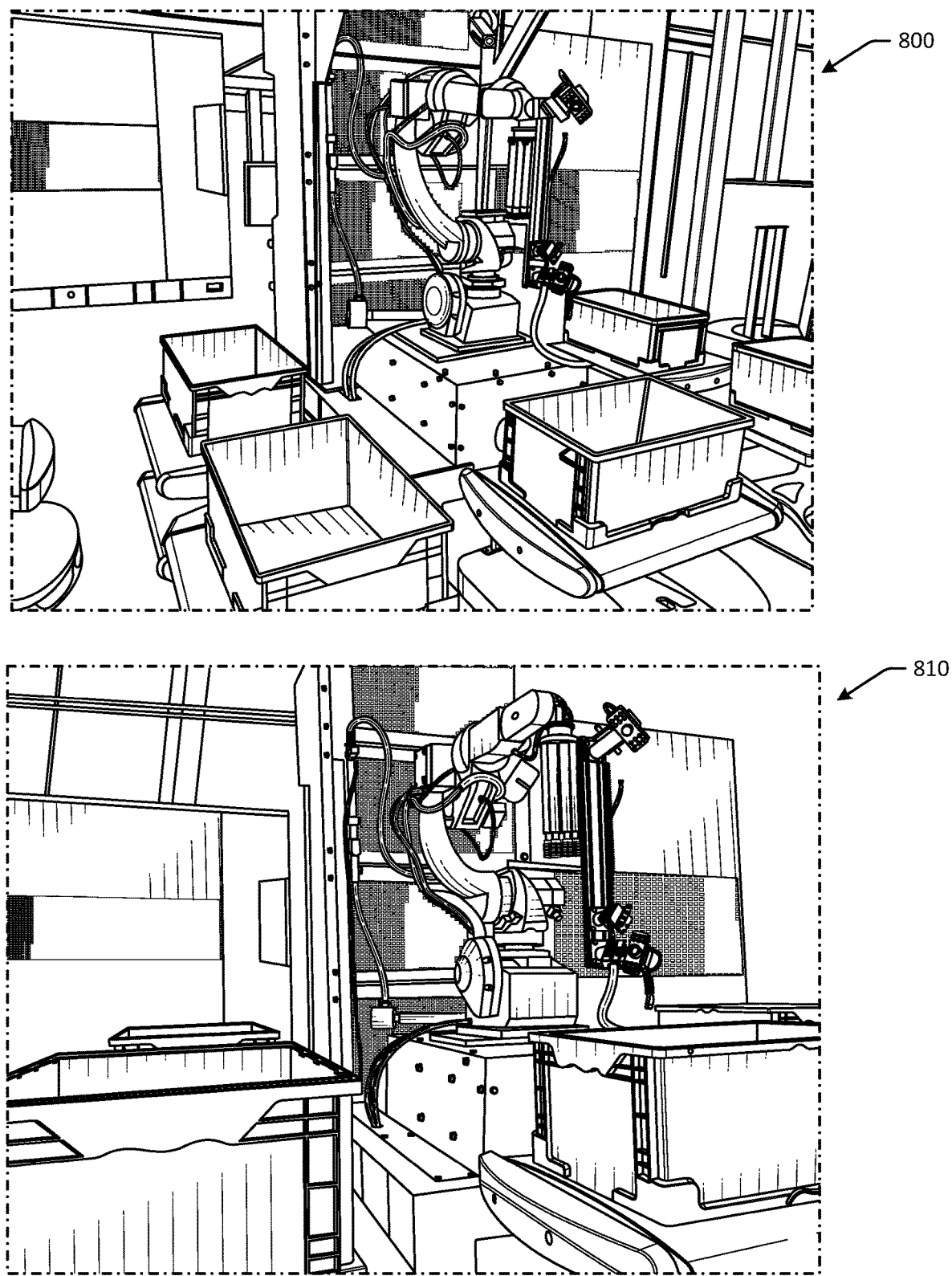

FIGS. 7-8 are schematic illustrations of a modular robotic manipulation system configured to consolidate items into containers coupled to autonomous robotic vehicles in accordance with one or more embodiments of the disclosure. Other embodiments may include additional or fewer components. The illustration of FIGS. 7-8 are not to scale, and may not be illustrated to scale with respect to other figures. The modular robotic manipulation systems illustrated in FIGS. 7-8 may include the same modular robotic manipulation system(s) discussed with respect to FIGS. 7-8.

In a first embodiment 700, a first robotic manipulator module 710 may be used in conjunction with a number of autonomous robotic vehicles 720 coupled to totes, where the autonomous robotic vehicles 720 bring items to the first robotic manipulator module 710 for ingestion into a horizontal flow packer machine for packing of the item for shipment. The first robotic manipulator module 710 may retrieve the items from the totes on the autonomous robotic vehicles 720, and may release the item onto a conveyor that leads to the horizontal flow packer. The items may be packed into packages, and a second robotic manipulator module 730 may be used to place the packages into empty totes, or otherwise onto autonomous robotic vehicles that are waiting downstream for outbound transit.

In a second embodiment 740, a third robotic manipulator module is depicted adjacent to a number of totes disposed on autonomous robotic vehicles. As visible in the front view of FIG. 7, the third robotic manipulator module may be a robotic system that includes a housing configured to secure the robotic system, and a robotic manipulator having a range of motion of at least 200 degrees with respect to a back wall of the third robotic manipulator module, where the robotic manipulator is configured to access items external to the robotic system.

The third robotic manipulator module may be configured to identify and grasp individual items using the robotic manipulator, and to release the individual items into a container of a plurality of containers that are coupled to respective individual autonomous robotic vehicles, where individual containers of the plurality of containers are designated for different destinations, and the individual items are grasped from a single container, such as a source container or a source cart that may also be disposed on an autonomous robotic vehicle.

In FIG. 8, a robotic manipulator of a robotic manipulator module is depicted in a first view 800 that is adjacent to a source tote and a second view 810 in which the robotic manipulator is adjacent to a destination tote. The robotic manipulator may be configured to grasp and move items from source to destination regardless of the exact positioning of the source tote and/or destination tote, as well as while compensating for movement of the respective totes before and after grasping items. The consistent and repeatable performance of the robotic manipulator may be a result of validation and testing that can be performed before shipment and/or deployment of the standalone robotic manipulator module, and can reduce setup or deployment time from hours to minutes.

One or more operations of the methods, process flows, or use cases of FIGS. 1-8 may have been described above as being performed by a user device, or more specifically, by one or more program module(s), applications, or the like executing on a device. It should be appreciated, however, that any of the operations of the methods, process flows, or use cases of FIGS. 1-8 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 9:
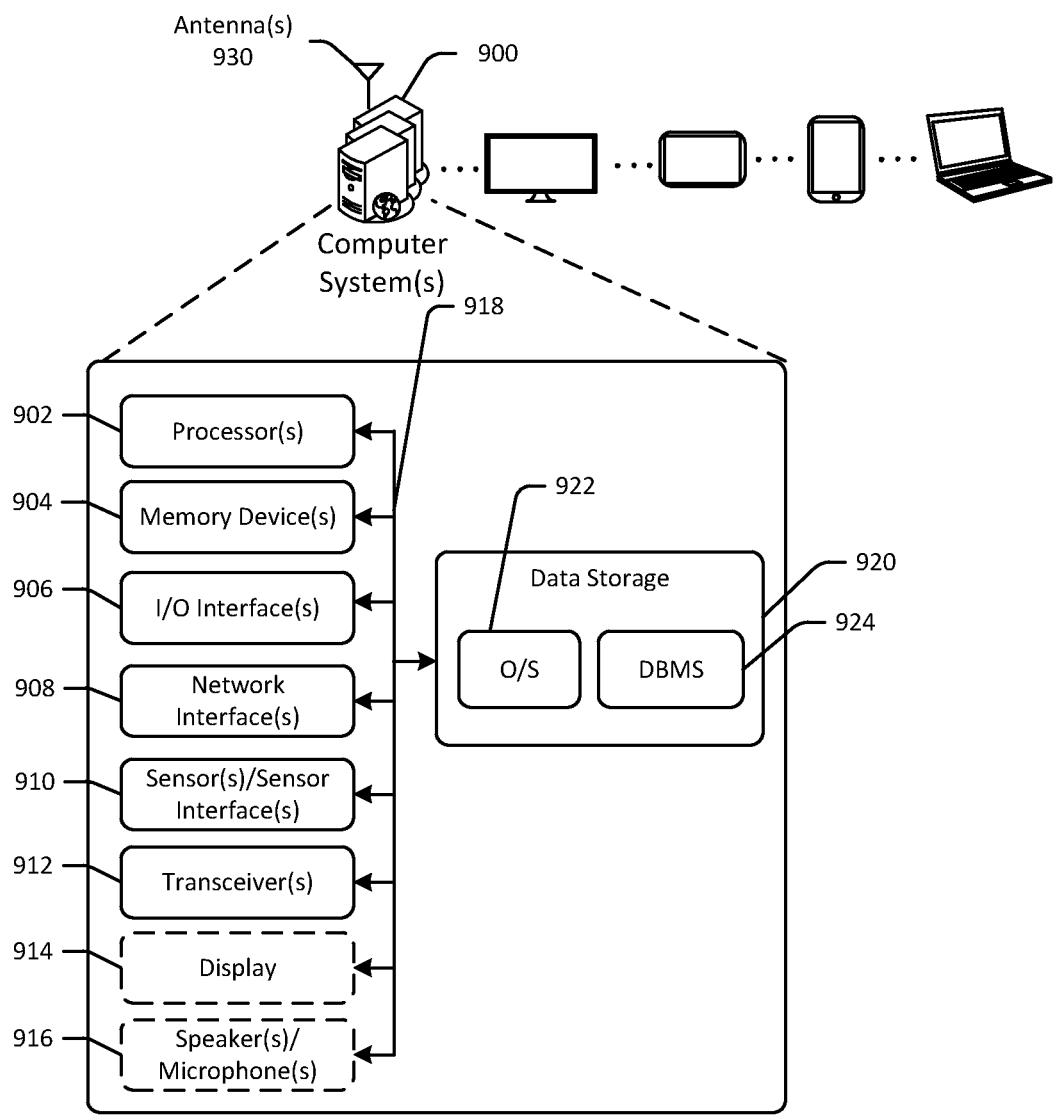
FIG. 9 schematically illustrates an example architecture of a computer system associated with a modular robotic manipulation assembly in accordance with one or more embodiments of the disclosure.

FIG. 9 is a schematic block diagram of one or more illustrative computer system(s) 900 in accordance with one or more example embodiments of the disclosure. The computer system(s) 900 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 900 may correspond to an illustrative device configuration for the controller(s) or computer system(s) of FIGS. 1-8.

The computer system(s) 900 may be configured to communicate with one or more servers, user devices, or the like. The computer system(s) 900 may be configured to control one or more components of modular robotic manipulation systems, mobile carrier units, sortation system components, and/or automated module movement systems.

The computer system(s) 900 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 900 may include one or more processors (processor(s)) 902, one or more memory devices 904 (also referred to herein as memory 904), one or more input/output (I/O) interface(s) 906, one or more network interface(s) 908, one or more sensor(s) or sensor interface(s) 910, one or more transceiver(s) 912, one or more optional display(s) 914, one or more optional microphone(s) 916, and data storage 920. The computer system(s) 900 may further include one or more bus(es) 918 that functionally couple various components of the computer system(s) 900. The computer system(s) 900 may further include one or more antenna(s) 930 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, a memory bus, an address bus, or a message bus, and may permit the exchange of information (e.g., data (including computer-executable code), signaling, etc.) between various components of the computer system(s) 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 904 of the computer system(s) 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to the memory 904 for use by the processor(s) 902 during the execution of the computer-executable instructions. Moreover, output data generated as a result of execution of the computer-executable instructions by the processor(s) 902 may be stored initially in the memory 904, and may ultimately be copied to the data storage 920 for non-volatile storage.

More specifically, the data storage 920 may store one or more operating systems (O/S) 922; one or more database management systems (DBMS) 924; and one or more program module(s), applications, engines, computer-executable code, scripts, or the like. Some or all of these module(s) may be sub-module(s). Any of the components depicted as being stored in the data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in the data storage 920 may support functionality described in reference to corresponding components named earlier in this disclosure.

The data storage 920 may further store various types of data utilized by the components of the computer system(s) 900. Any data stored in the data storage 920 may be loaded into the memory 904 for use by the processor(s) 902 in executing computer-executable code. In addition, any data depicted as being stored in the data storage 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 902 may be configured to access the memory 904 and execute the computer-executable instructions loaded therein. For example, the processor(s) 902 may be configured to execute the computer-executable instructions of the various program module(s), applications, engines, or the like of the computer system(s) 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to other illustrative components depicted as being stored in the data storage 920, the O/S 922 may be loaded from the data storage 920 into the memory 904 and may provide an interface between other application software executing on the computer system(s) 900 and the hardware resources of the computer system(s) 900. More specifically, the O/S 922 may include a set of computer-executable instructions for managing the hardware resources of the computer system(s) 900 and for providing common services to other application programs (e.g., managing memory allocation among various application programs). In certain example embodiments, the O/S 922 may control execution of the other program module(s). The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 900 is a mobile device, the DBMS 924 may be any suitable lightweight DBMS optimized for performance on a mobile device.

Referring now to other illustrative components of the computer system(s) 900, the input/output (I/O) interface(s) 906 may facilitate the receipt of input information by the computer system(s) 900 from one or more I/O devices as well as the output of information from the computer system(s) 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), FireWire, Thunderbolt, Ethernet port or other connection protocol that may connect to one or more networks. The I/O interface(s) 906 may also include a connection to one or more of the antenna(s) 930 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 900 may further include one or more network interface(s) 908 via which the computer system(s) 900 may communicate with any of a variety of other systems, platforms, networks, devices, and so forth. The network interface(s) 908 may enable communication, for example, with one or more wireless routers, one or more host servers, one or more web servers, and the like via one or more networks.

The antenna(s) 930 may include any suitable type of antenna depending, for example, on the communications protocols used to transmit or receive signals via the antenna(s) 930. Non-limiting examples of suitable antennas may include directional antennas, non-directional antennas, dipole antennas, folded dipole antennas, patch antennas, multiple-input multiple-output (MIMO) antennas, or the like. The antenna(s) 930 may be communicatively coupled to one or more transceivers 912 or radio components to which or from which signals may be transmitted or received.

As previously described, the antenna(s) 930 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 930 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11 ad). In alternative example embodiments, the antenna(s) 930 may be configured to transmit or receive radio frequency signals within any suitable frequency range forming part of the unlicensed portion of the radio spectrum.

The antenna(s) 930 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(s) 930—transmitting or receiving radio frequency (RF) signals in the bandwidth and/or channels corresponding to the communications protocols utilized by the computer system(s) 900 to communicate with other devices. The transceiver(s) 912 may include hardware, software, and/or firmware for modulating, transmitting, or receiving—potentially in cooperation with any of antenna(s) 930—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the computer system(s) 900. The transceiver(s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 914 may be configured to output light and/or render content. The optional speaker(s)/microphone(s) 916 may be any device configured to receive analog sound input or voice data.

It should be appreciated that the program module(s), applications, computer-executable instructions, code, or the like depicted in FIG. 9 as being stored in the data storage 920 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 900, and/or hosted on other computing device(s) accessible via one or more networks, may be provided to support functionality provided by the program module(s), applications, or computer-executable code depicted in FIG. 9 and/or additional or alternate functionality. Further, functionality may be modularized differently such that processing described as being supported collectively by the collection of program module(s) depicted in FIG. 9 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 9 may be implemented, at least partially, in hardware and/or firmware across any number of devices.

It should further be appreciated that the computer system(s) 900 may include alternate and/or additional hardware, software, or firmware components beyond those described or depicted without departing from the scope of the disclosure. More particularly, it should be appreciated that software, firmware, or hardware components depicted as forming part of the computer system(s) 900 are merely illustrative and that some components may not be present or additional components may be provided in various embodiments. While various illustrative program module(s) have been depicted and described as software module(s) stored in the data storage 920, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A portable robot assembly comprising:
a removable housing that is configured to secure the portable robot assembly during transport;
a computer rack;
a controller coupled to the computer rack;
a moveable display;
a base;
a robotic manipulator coupled to the base, wherein the robotic manipulator is configured to access a first external side, a second external side, and a third external side of the portable robot assembly;
an end of arm tool coupled to the robotic manipulator;
a cantilevered camera system; and
an overhead camera system comprising a first camera configured to image the first external side of the portable robot assembly, and a second camera configured to image the second external side of the portable robot assembly;
wherein the portable robot assembly is configured to identify and grasp consecutive individual items having different geometries using the robotic manipulator, and to place the respective individual items at a particular location in a container of a plurality of containers.

2. The portable robot assembly of claim 1, wherein the portable robot assembly is coupled to a rotating container modular assembly that supports the plurality of containers, and wherein the rotating container modular assembly is configured to rotate the plurality of containers adjacent to the robotic manipulator.

3. The portable robot assembly of claim 1, wherein the plurality of containers comprises a first container coupled to a first mobile robot, and a second container coupled to a second mobile robot;
wherein the first mobile robot is configured to move the first container from a first location relative to the portable robot assembly to a second location, and the second mobile robot is configured to move the second container from the first location relative to the portable robot assembly to the second location.

4. The portable robot assembly of claim 1, wherein the portable robot assembly is coupled to a source container modular assembly and a rotating container modular assembly, and wherein the portable robot assembly is configured to grasp items from a container at the source container modular assembly, and to release items into containers of the rotating container modular assembly.

5. A modular robot assembly comprising:
a housing comprising a base and computer rack;
a robotic manipulator coupled to the base, wherein the housing is configured to provide the robotic manipulator access to a first side, a second side, and a third side of the modular robot assembly, and wherein the robotic manipulator is configured to identify and grasp consecutive individual items having different geometries;
a cantilevered member;
a first camera system coupled to the cantilevered member;
a second camera system coupled to the housing, the second camera system comprising a first camera configured to image the first side, and a second camera configured to image the second side; and
a controller;
wherein the modular robot assembly is configured to be coupled to a plurality of other modular robot assemblies, and wherein the housing is configured to be secured, such that the modular robot assembly can be independently transported.

6. The modular robot assembly of claim 5, further comprising:
a vacuum generator; and
an end of arm tool coupled to the robotic manipulator and the vacuum generator.

7. The modular robot assembly of claim 5, further comprising:
a display coupled to the housing;
wherein the display is in electrical communication with the controller, and wherein the controller and display together form a human-machine interface configured to locally control operation of the modular robot assembly.

8. The modular robot assembly of claim 5, wherein the first camera system is configured to optically detect barcodes.

9. The modular robot assembly of claim 5, wherein the modular robot assembly is configured to identify and grasp individual items from a plurality of containers using the robotic manipulator, and to release the individual items into a single container.

10. The modular robot assembly of claim 5, wherein the modular robot assembly is configured to:
(i) identify and grasp individual items using the robotic manipulator, and to release the individual items into a container of a plurality of containers; or
(ii) identify and grasp individual items from the plurality of containers using the robotic manipulator, and to release the individual items into a single container.

11. The modular robot assembly of claim 10, wherein the modular robot assembly is coupled to a rotating container modular assembly that comprises the plurality of containers, and wherein the rotating container modular assembly is configured to rotate the plurality of containers adjacent to the robotic manipulator.

12. The modular robot assembly of claim 10, wherein individual containers of the plurality of containers are designated for different destinations, and wherein the individual items are grasped from a single container.

13. The modular robot assembly of claim 10, wherein the plurality of containers comprises a first container coupled to a first mobile robot, and a second container coupled to a second mobile robot;
wherein the first mobile robot is configured to move the first container from a first location relative to the modular robot assembly to a second location, and the second mobile robot is configured to move the second container from the first location relative to the modular robot assembly to the second location.

14. The modular robot assembly of claim 5, wherein the second camera system is an overhead camera system.

15. The modular robot assembly of claim 5, wherein the first camera and the second camera are vertically rotatable with respect to the housing.

16. The modular robot assembly of claim 5, wherein the modular robot assembly is coupled to a source container modular assembly and a rotating container modular assembly, and wherein the modular robot assembly is configured to grasp items from a container at the source container modular assembly, and to release items into containers of the rotating container modular assembly.

17. The modular robot assembly of claim 5, further comprising:
  a gate; and
  a sensor configured to detect a position of the gate;
  wherein the controller is configured to pause operation of the modular robot assembly when the gate is unsecured.

18. A robotic system comprising:
  a housing configured to secure the robotic system;
  a computer closet;
  a robotic manipulator having a range of motion of at least 200 degrees and configured to access items external to the robotic system;
  a cantilevered member;
  a first camera system coupled to the cantilevered member; and
  a second camera system coupled to the housing, the second camera system comprising a first camera configured to image a first side of the robotic system, and a second camera configured to image a second side of the robotic system, wherein the first camera and the second camera are vertically rotatable with respect to the housing;
  wherein the robotic system is configured to be coupled to a plurality of other modular robot systems, and wherein the robotic system can be independently transported.

19. The robotic system of claim 18, wherein the robotic system is configured to identify and grasp individual items using the robotic manipulator, and to release the individual items into a container of a plurality of containers supported by a rotating container modular assembly; and
  wherein individual containers of the plurality of containers are designated for different destinations, and the individual items are grasped from a single container.

20. The robotic system of claim 18, further comprising:
  a controller disposed in the computer closet; and
  a display coupled to the computer closet;
  wherein the display is in electrical communication with the controller, and wherein the controller and display together form a human-machine interface configured to locally control operation of the robotic system.

* * * * *